United States Patent
Sarkar et al.

(10) Patent No.: US 6,937,569 B1
(45) Date of Patent: Aug. 30, 2005

(54) METHOD AND SYSTEM FOR DETERMINING A RELATIVE POSITION OF A DEVICE ON A NETWORK

(75) Inventors: Shantanu Sarkar, San Jose, CA (US); Steven G. Fry, Oakland, CA (US); Johnny C. Chan, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 970 days.

(21) Appl. No.: 09/862,049

(22) Filed: May 21, 2001

(51) Int. Cl.[7] .............................................. G01R 31/08

(52) U.S. Cl. .................... 370/238; 370/252; 370/519

(58) Field of Search ............................. 370/252, 238, 370/238.1, 253, 254, 257, 351, 386, 400, 370/401, 402, 516, 517, 519

(56) References Cited

U.S. PATENT DOCUMENTS

| | | | | |
|---|---|---|---|---|
| 5,596,719 A | * | 1/1997 | Ramakrishnan et al. | 709/241 |
| 5,608,721 A | * | 3/1997 | Natarajan et al. | 370/238 |
| 6,762,997 B1 | * | 7/2004 | Liu et al. | 370/238 |
| 6,816,460 B1 | * | 11/2004 | Ahmed et al. | 370/238 |
| 2003/0069694 A1 | * | 4/2003 | Fuchs et al. | 701/213 |

* cited by examiner

*Primary Examiner*—Phirin Sam
(74) *Attorney, Agent, or Firm*—Baker Botts L.L.P.

(57) ABSTRACT

A method and system for determining a relative location of a device on a network is provided. In this system and method, a list of landmark nodes provided on the network is received. Then, a value which is a time, a latency and/or a distance from the device to each of the landmark nodes is determined. Each of the determined values corresponding to the respective node of the landmark nodes is transmitted to a central arrangement to provide the relative location of the device with respect to the landmark nodes.

32 Claims, 5 Drawing Sheets

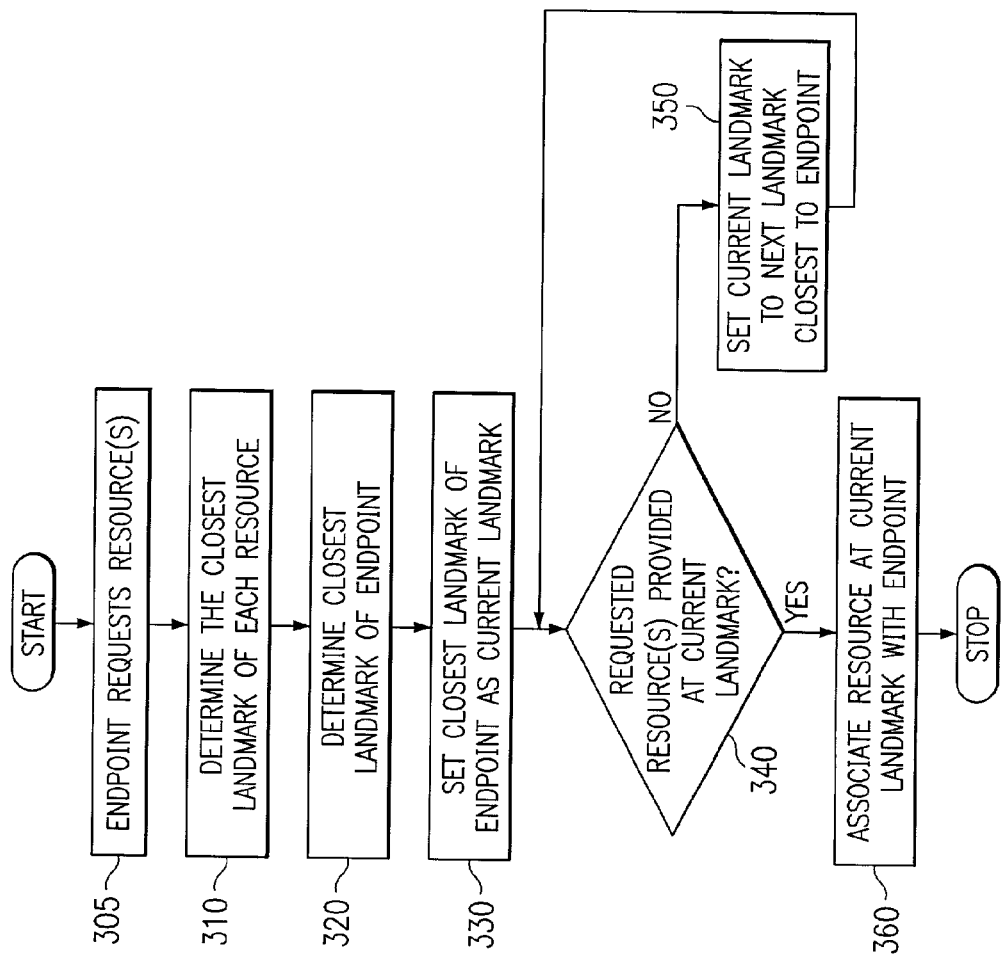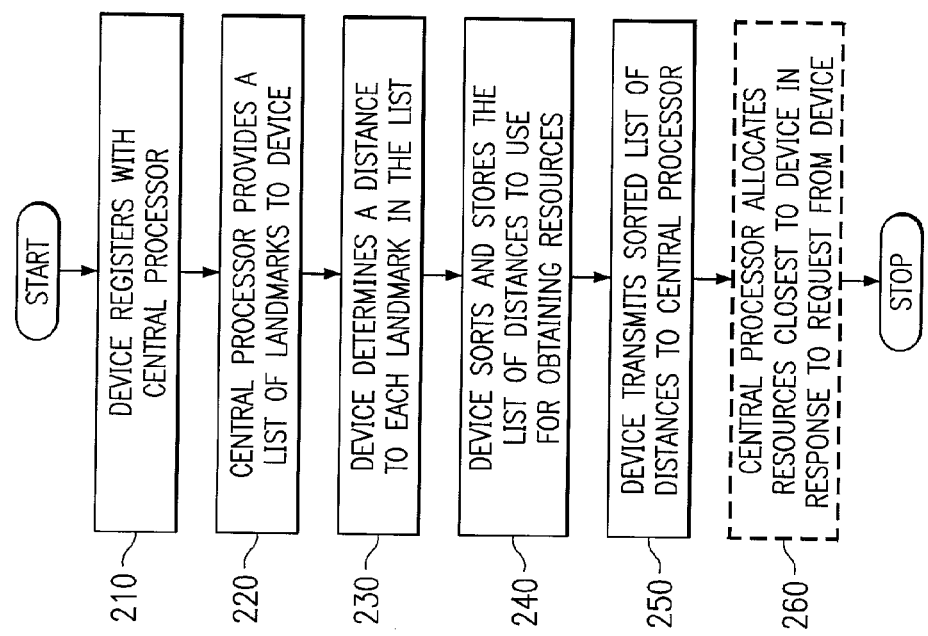

METHOD AND SYSTEM FOR DETERMINING A RELATIVE POSITION OF A DEVICE ON A NETWORK

TECHNICAL FIELD OF THE INVENTION

The present invention relates in general to packet-based communication networks, and more particularly to a method and system for determining a relative position of a device on a network.

BACKGROUND OF THE INVENTION

Transcoding and conferencing sessions may occur over packet-based networks which utilize, e.g., Voice over Packet ("VoP"), Voice over Internet Protocol ("VoIP"), and may allow for the collaboration of video, audio and data. These sessions are executed by processors, such as digital signal processors ("DSPs"), which create, modify and terminate media streams communicated to devices participating in the sessions. These DSPs can be arranged as DSP farms to be used as resources for end-user devices. The VoIP network may also include telephony trunks for purposes of communicating with the Public Switched Telephone Network ("PSTN"). The end-user devices which use the resources of the VoIP network are generally Internet Protocol ("IP") devices. It is generally advantageous for the IP devices provided on the VoIP Network to utilize the resources which are located closest to them, i.e., these requiring the least time to transmit data packets therebetween, so as to minimize latency and possible jitter of such data packets.

Conventional systems and methods determine the closest resources to the respective IP devices by a manual creation of a static list of the locations of all IP devices and resources in the network. However, such conventional techniques are time consuming and tedious since there can be an extremely large number of IP devices and resources. In addition, if one or more of the IP devices or resources are moved to a different location, all relevant entities must be updated.

SUMMARY OF THE INVENTION

In accordance with the teachings of the present invention, the disadvantages and problems associated with determining a closest resource to an endpoint have been substantially reduced or eliminated.

In an aspect of the present invention, the method and system determines a relative location of a device on a network. According to the system and method, a list of landmark nodes provided on the network is received. Then, a value which is a time, a latency and/or a distance from the device to each of the landmark nodes is determined. Thereafter, each of the determined values corresponding to the respective node of the landmark nodes is transmitted to a central arrangement to provide the relative location of the device with respect to the landmark nodes.

In another aspect of the present invention, before the determined values are transmitted, each of these values is associated with the respective node of the landmark nodes to create a measured list. The measured list can be sorted and then transmitted to the central arrangement. Such measured list can be sorted from a smallest value of the determined values to a largest value of the determined values.

In another aspect of the present invention, the device is an endpoint device such as an IP telephone and/or a resource arrangement. Before the list of landmark nodes is received, the device can be registered with the central arrangement when the device is connected to the network. The determined values corresponding to the landmark nodes may be transmitted in response to the registration of the device.

According to another aspect of the present invention, the device determines the values for the landmark nodes by executing a ping on each of the landmark nodes and/or performing a response time-type command executed on each of the landmark nodes. This result provides the time, the latency and/or the distance of the device to each of the landmark nodes.

According to yet another aspect of the present invention, the device monitors messages transmitted by each of the landmark nodes to obtain a receipt time of each of the messages by the device, with each of the messages including a transmission time by the respective node of the landmark nodes. The values of the landmark nodes can be determined by comparing the transmission and receipt times of each of the landmark nodes. A clock of the device and clocks of the landmark nodes can be synchronized prior to the determination of the values for the landmark nodes.

In still another aspect of the present invention, after the transmission of the determined values, a list of further landmark nodes can be received. Then, the values for the further landmark nodes are determined with respect to the device, the determined values for the further landmark nodes being smaller than the determined values for the landmark nodes that are not the further landmark nodes. Also, the determined values for the further landmark nodes are transmitted to the central arrangement.

In another aspect of the present invention, the device can request a resource. A list of particular landmark nodes, each of which is associated with the resource, may be assembled, the list of the particular landmark nodes being a subset of the landmark nodes. The resource is then allocated to the device based on the determined values for each of the particular landmark nodes. The resource can be allocated to the device if the determined value for the respective node of the particular landmark nodes associated with the resource is the smallest value of the values determined for the particular landmark nodes.

Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 4 is a flow diagram illustrating an exemplary embodiment of a method for determining a relative position of a device on the network;

FIG. 5 is flow diagram illustrating an exemplary embodiment of a method for associating a closest resource with the representative endpoint;

DETAILED DESCRIPTION OF THE INVENTION

Figure 1:
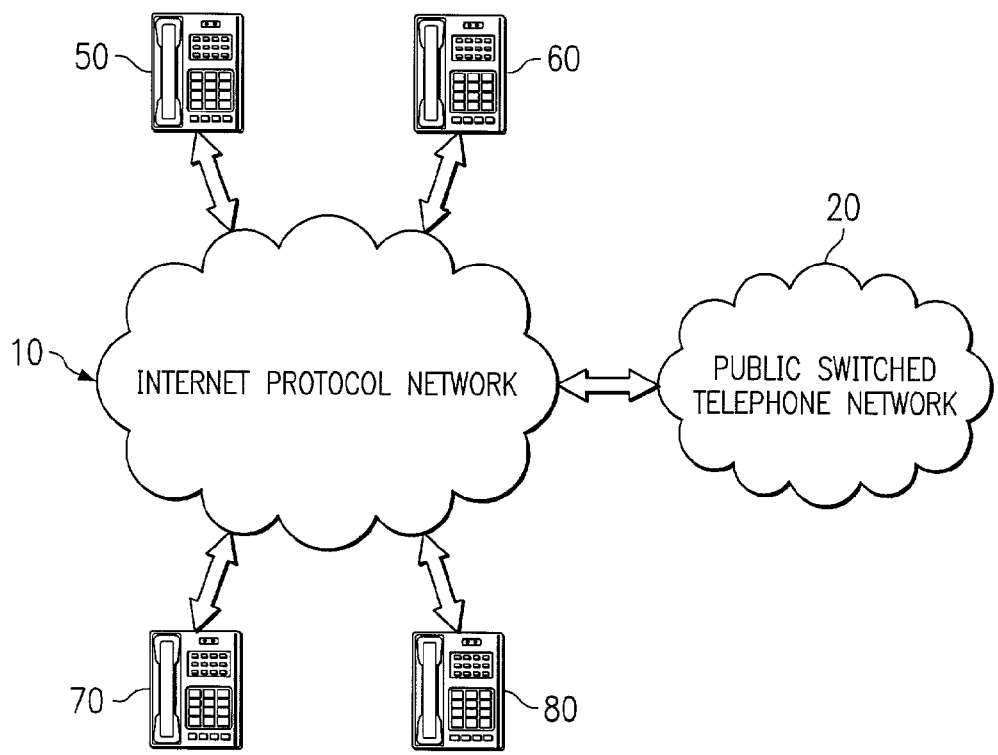
FIG. 1 is an exemplary embodiment of a communication network according the present invention, which is connected to a public switched telephone network and endpoints.

FIG. 1 illustrates an exemplary embodiment of a communication network 10 which is connected to a public switched telephone network 20 and to a plurality of endpoints 50, 60, 70, 80. Each of the endpoints 50, 60, 70, 80 utilizes the network 10 to communicate with other endpoints and/or devices (e.g., non IP-compatible telephones) which are not provided on the network 10. In the case where the communication between the endpoints 50, 60, 70, 80 and the devices not on the network 10 becomes necessary, the network 10 can be connected to a public switched telephone system ("PSTN") 20, which is a collection of interconnected voice-oriented public telephone networks. Each of the endpoints 50, 60, 70, 80 is capable of transmitting and receiving any media (e.g., data, voice and video streams) via the network 10. These streams can be converted into a suitable analog or digital form to allow the endpoints 50, 60, 70, 80 to communicate with the devices that are not on the network 10.

The endpoints 50, 60, 70, 80 may be any combination of hardware and/or software that provide communication services to a user. For example, each of the endpoint 50, 60, 70, 80 may be a telephone (as shown in FIG. 1), a computer executing a telephone-related software, a video monitor, a camera, or any other communication or processing hardware and/or software that supports the communication of the media using the network 10. Although FIG. 1 illustrates four endpoints 50, 60, 70, 80, any number of the endpoints can be connected to the network 10 for transceiving media streams.

The network 10 may be a local area network (LAN), wide area network (WAN), global distributed network such as the Internet, intranet, extranet, or any other form of wireless or wireline communication network. Generally, the network 10 facilitates the transmission and reception of packets, cells, frames, or other portion of information (generally referred to as packets) for communication between the endpoints 50, 60, 70, 80, and between other devices internal to and external from the network 10 and the endpoints 50, 60, 70, 80. The network 10 may include any combination of routers, hubs, switches, servers, printers, workstations, minicomputers and other hardware and/or software that allow for the exchange of the packets in the network 10.

In the exemplary embodiment of the present invention, the network 10 utilizes communication protocols that allow for the addressing and/or identification of the endpoints 50, 60, 70, 80, resources, central processors and other devices coupled to the network 10. For example, by using the Internet protocol ("IP"), each of the components coupled together by the network 10 may be identified using IP addresses. In this manner, the network 10 may support any form and combination of point-to-point, multicast, unicast, or other techniques for exchanging the media packets between the components provided on the network 10. In one exemplary embodiment, the network 10 is a VoIP network which facilitates voice-type communication between the IP telephones 50, 60, 70, 80 by transmitting voice information in digital form in discrete packets. With the VoIP network, it is also contemplated to communicate with the devices that are not designed for digital communication with the IP telephones 50, 60, 70, 80, e.g., a standard telephone connected to the PSTN 20. The network 10 may also be a network which utilizes protocols other than the Internet protocol.

Figure 2:
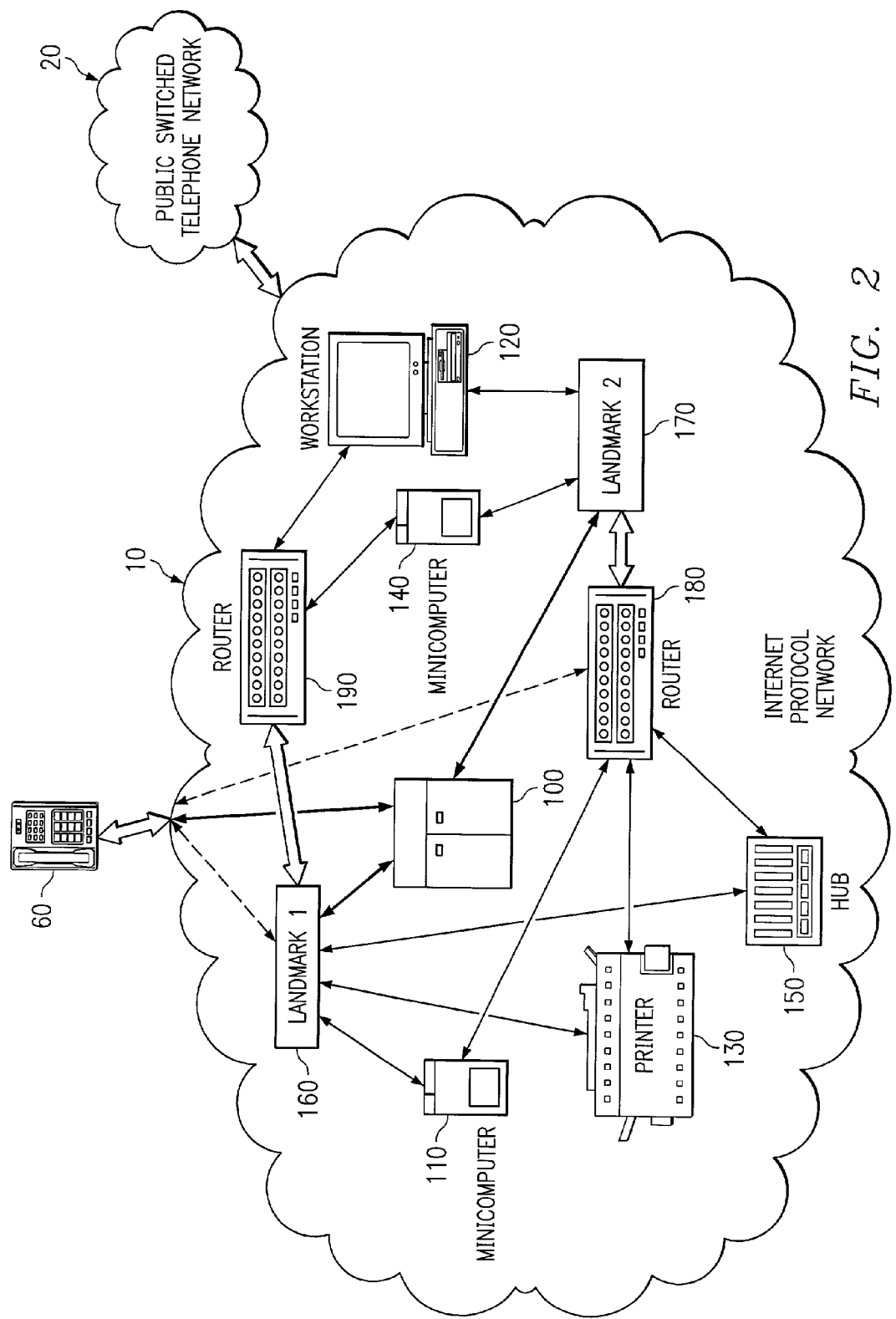
FIG. 2 is a detailed exemplary diagram of the communication network shown in FIG. 1 which includes a central processor, landmarks and resources communicating with a representative endpoint.

FIG. 2 illustrates a detailed exemplary diagram of the network 10 shown in FIG. 1, in which the network 10 is connected to the PSTN 20 so that the endpoints 50, 60, 70, 80 can communicate with the external devices, i.e., the devices that are connected to the PSTN 20 and not directly to the network 10. FIG. 2 also shows that the exemplary endpoint 60 is either already connected or being connected to the network 10. However, it should be understood that the drawing illustrates one endpoint 60 connected to the network for the sake of clarity. Indeed, the present invention encompasses that more than one endpoint can be connected to the network 10, as illustrated in FIG. 1. Indeed, it is contemplated that a large number of endpoints will be connected to such network 10 so as to fully utilize its resource potential, with each such endpoint utilizing the method and system as shall be discussed with reference to the endpoint 60. The use of the resources provided on the network 10 is described in greater detail below.

As shown in FIG. 2 and discussed above, the network 10 includes a number of devices other than the endpoints 50, 60, 70, 80. For example, these devices may be routers, hubs, switches, servers, printers, workstations, minicomputers and the like. Some or all of such devices may be used by the endpoint 60 as resources, such as a minicomputer 110, a workstation 120, a printer 130, another minicomputer 140 and a hub 150. The network 10 has a central processor 100 which can be connected thereto, which is used to maintain a list of all landmarks (e.g., landmarks 160, 170) provided on the network 10. Each of the landmarks 160, 170 can be a node connected to the network 10, and the landmarks can be representative of the topology of the network 10. The landmark can be any IP-type device situated in the central campus, e.g., a computer connected to the network 10 via a network card, a network printer, etc. In an exemplary network of a company which has, e.g., a central campus and three branch offices, the central campus may have a central location landmark, while each of the branch offices may possess a respective branch landmark.

As shown in the exemplary embodiment of FIG. 2, the resources 110, 120, 130, 140, 150 communicate with each of the landmarks 160, 170. Such exemplary arrangement assumes that each of the resources 110, 120, 130, 140, 150 has already been connected to the network 10, and their respective distances from each of the landmarks 160, 170 have been determined. It is advantageous for each landmark 160, 170 to compile and maintain a list of the resources 110, 120, 130, 140, 150, the respective IP address assigned to the respective resources and the distances therefrom. The central processor 100 is configured to communicate with the landmarks 160, 170 and with the endpoint 60. It should be understood to be within the scope of the present invention that the central processor 100 may communicate with more than one endpoint 60. In another embodiment, the resources can be dynamically connected to the network 10, and assigned to a particular landmark, as shall be described below with reference to FIG. 6.

According to an exemplary embodiment, the central processor 100 stores a list of the resources which are provided closest to each respective landmark. When the endpoint 60 connects to the network 10 and registers with the central processor 100, the central processor 100 can assign the resource(s) requested by the endpoint 60. Such assignment of the resource(s) can be based on the relative distance of the endpoint from the landmarks which have the requested resource(s).

In the exemplary embodiment of FIG. 2, the microcomputer 110, the printer 130 and the hub 150 are interconnected with the landmark 160 without the utilization of any other intermediary devices, while they are interconnected with the landmark 170 via a router 180. In contrast, the workstation 120 and the minicomputer 140 of FIG. 2 require a connection through a router 190 for their interconnections with the landmark 160, while requiring no other intermediary device for the interconnection between the workstation 120 and the minicomputer 140 with the landmark 170. Therefore, because their communication with the landmark 160 takes less time than the communication with the landmark 170, the resources 110, 130, 150 can be associated and grouped with the landmark 160. With respect to the resources 120, 140, their communication with the landmark 160 takes more time than their communication with the landmark 170, and thus the resources 120, 140 would be associated with the landmark 170.

Figure 3:
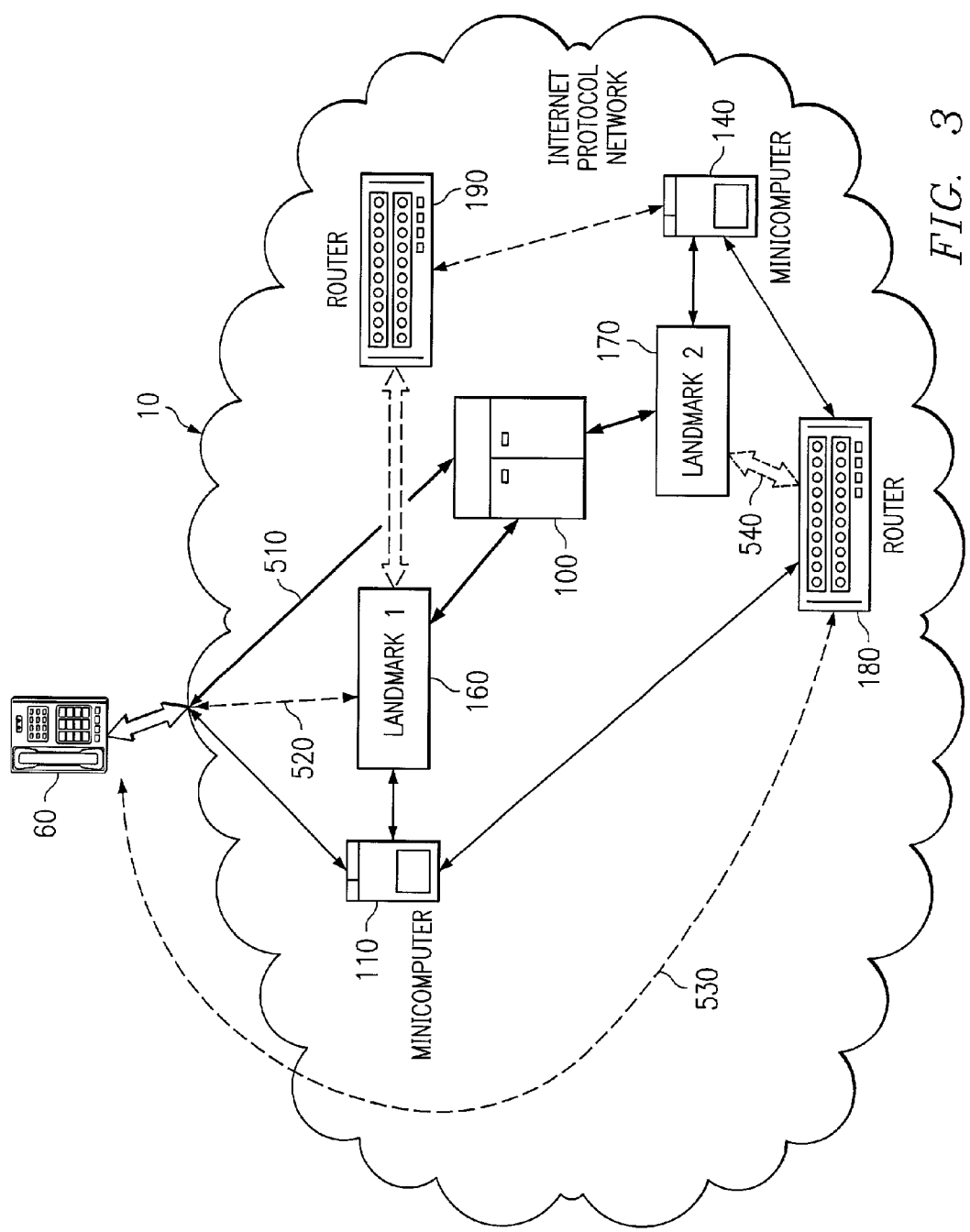
FIG. 3 is a diagram of the communication network of FIG. 2 illustrating a connection and communication of the representative endpoint with the central processor and the landmarks.

An embodiment of the method according to the present invention shall now be described with reference to FIGS. 3 and 4. FIG. 3 illustrates a simplified diagram of the network 10 shown in FIG. 2 in which two minicomputers 110, 140 are connected on the network 10, and in which the endpoint 60 may request a resource which can be provided by one of these minicomputers 110, 140. When the endpoint 60 (generically referred to as a device in FIG. 4) is connected to the network 10, it connects to the central processor 100 via a first communication path 510, and then registers with the central processor 100 (step 210 of FIG. 4). The registration of the endpoint 60 takes place by the endpoint 60 transmitting its assigned address, e.g., the IP address, to the central processor 100 via the first communication path 510. After the registration of the endpoint 60, the central processor 100 forwards a list of all landmarks on the network 10 (which are known to the central processor 100) via the first communication path 510 to the endpoint 60 (step 220 of FIG. 4). As shown in the exemplary illustration of FIG. 3, there are two landmarks 160, 170 provided on the network 10. The list of the landmarks generally includes the address of each landmark (e.g., an IP address), as well as the identification of the respective landmark. For example, the list may have the following form:

| LANDMARK 1 | 125.25.33.10 |
| LANDMARK 2 | 134.87.78.36 |

In another embodiment, a number of central processors which store and manage separate respective lists of landmarks can exist on the network 10. In such embodiment, the endpoint 60 can connect to the central processor 100 which is provided on a portion of the network 10 (e.g., a subnet of the network 10) to which the endpoint 60 connects. The central processor 100 may then transmit to the endpoint 60 a list of a particular set of the landmarks which is managed by the central processor 100. This particular set may include all landmarks or only specific landmarks known to the central processor 100 (e.g., which reside on the portion of the network 10 managed by the particular central processor 100).

After the receipt of the list of the landmarks 160, 170, the endpoint 60 determines its distance and/or latency from each of the landmarks 160, 170 provided in the list by the central processor 100 (step 230 of FIG. 4). According to one exemplary embodiment, the determination of the distance and/or latency from the endpoint 60 to each of the landmarks 160, 170 can be performed by the endpoint 60 utilizing a latency measurement mechanism. Such mechanisms can be a "ping" or a "response time reporter", both of which mechanisms are known to those having ordinary skill in the art. With reference to FIG. 3, the endpoint 60 would execute the latency measurement mechanism (e.g., the "ping") to determine its relative distance, e.g., in terms of latency, from the landmark 160. Thus, the endpoint 60 transmits this mechanism via a second communication path 520.

As shown in FIG. 3, the landmark 160 is provided substantially near the connection point of the endpoint 60 to the network 10. Also, no other devices are interconnected between the endpoint 60 and the landmark 160 on the second communication path 520. Thus, the time returned by the endpoint's execution of the mechanism for the landmark 160 is relatively small, and therefore the distance between the endpoint 60 and the landmark 160 is relatively short. Also, there is only a single "hop" provided between the endpoint 60 and the landmark 160.

However, the landmark 170 is provided at a distance and away from the endpoint 60. Also, the endpoint 60 executes the latency measurement mechanism to reach the landmark 170 via a third communication path 530 to reach the router 180, and then via a fourth communication path 540 to reach the landmark 170. Thus, the time returned by the endpoint's execution of the mechanism for the landmark 170 is greater in comparison with the time returned for the landmark 160. Therefore, the distance between the endpoint 60 and the landmark 170 is also longer in comparison with the distance between the endpoint 60 and the landmark 160. Also, due to the requirement to use the third and fourth communication paths 530, 540, there are two "hops" provided for communication between the endpoint 60 and the landmark 160. The determination of the distance between the endpoint 60 and the landmarks 160, 170 can also be done by utilizing the number of hops that it took to reach each respective landmark from the endpoint 60.

Thereafter, the endpoint 60 compiles a list of the distances, times and/or latencies between the endpoint 60 and each of the landmarks 160, 170. The list is then sorted in increasing order, from the smallest distance, time and/or latency between the endpoint 60 and the landmarks to the largest (step 240 in FIG. 4). This exemplary sorted list can include the name of the landmark, the IP address thereof, and the time/distance/latency from the endpoint, and may be provided in the following form:

| LANDMARK 1 | 125.25.33.10 | 10 msec |
| LANDMARK 2 | 134.87.78.36 | 300 msec |

Then, in step 250 of FIG. 4, the endpoint 60 transmits the sorted list of the distances/times/latencies to the central processor 100 via the first communication path 510, which stores this list (in association with the endpoint 60) in its storage device. Then, in step 260 of FIG. 4, the central processor 100 is ready to allocate resources to the endpoint 60 which are closest thereto. In this manner, the system and method minimizes the time it takes for the endpoint 60 to communicate with the requested resource.

The central processor 100 can be aware of the connectivity of each landmark 160, 170 to the network 10, and to each other. According to the present invention, if the landmark 160 of the resource (e.g., the minicomputer 110) is the same as the landmark 160 of the endpoint 60, then the minicomputer 110 is the closest resource for the endpoint 60. Otherwise, the search for the closest resources for the endpoint 60 moves outward to the landmarks other than the closest landmark.

FIG. 5 illustrates an exemplary embodiment of the method in which the endpoint 60 obtains the use of resources that are closest thereto. For example, one such requested resource may be a minicomputer. Thus, in step 305, the endpoint 60 transmits a request to the central processor 100 (via the first communication path 510) to obtain the services of such minicomputer. The central computer 100 retrieves a list of the landmarks, and determines the closest landmark for the requested resource (step 310). In the present exemplary embodiment illustrated in FIG. 2, the central processor 100 determines that the closest landmark of the minicomputer 110, the printer 130 and the hub 150 is the landmark 160, and the closest landmark of the workstation 120 and the microcomputer 140 is the landmark 170 (see FIG. 2). Then, the central processor 100 determines the closest landmark to the endpoint 60 (step 320 of FIG. 5). In the present example, the closest landmark to the endpoint 60 is the landmark 160 (see FIG. 3).

Then, in step 330, the central processor 100 sets the closest landmark of the endpoint 60 (i.e., the landmark 160) to be the current test landmark for processing. The central processor 100 determines whether the resource requested by the endpoint 60 is provided at the current test landmark (step 340). If not, then the central processor 100 sets the current test landmark to be the next closest landmark to the endpoint 60 (step 350), and repeats the procedure for the requested resource at the current test landmark in step 340. In the exemplary embodiment illustrated in FIGS. 2 and 3, the requested resource is a minicomputer, and the landmark 160 closest to the endpoint 60 includes the minicomputer 110. Finally, in step 360 of FIG. 5, after the requested resource is obtained at the current test landmark, the central processor 100 associates and/or avails the resource provided at this current test landmark (i.e., the minicomputer 110) with the endpoint 60 requesting such resource.

Figure 6:
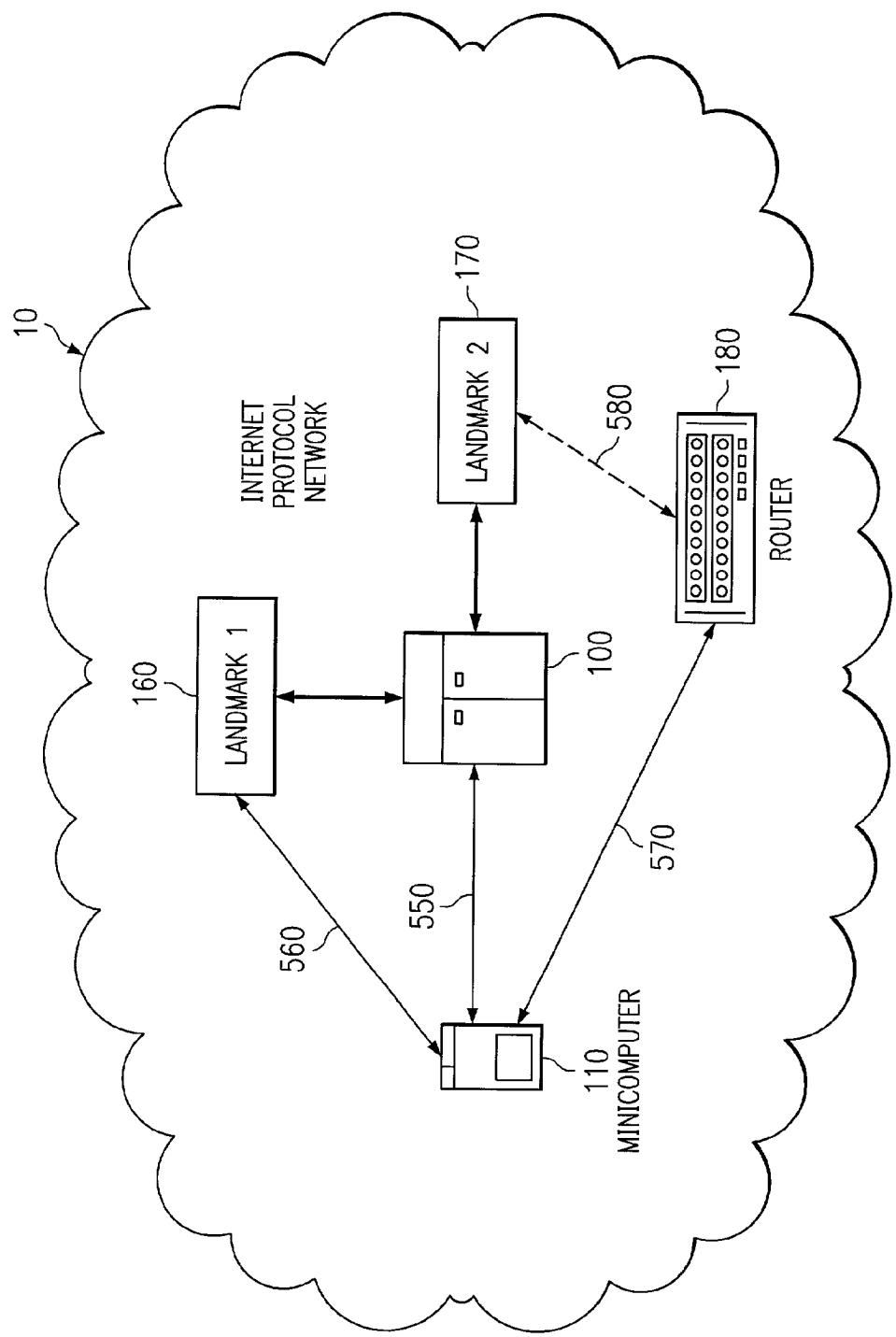
FIG. 6 is a detailed exemplary diagram of the communication network shown in FIG. 2 which includes a representative communication between the central processor, landmarks and resources.

FIG. 6 illustrates an exemplary embodiment of the network 10 in which the resource (e.g., the minicomputer 110) is being connected to the network 10 and associated with an appropriate closest landmark. This exemplary procedure allows the dynamic and automatic association of the resources so that their locations in the network 10 do not have to be manually modified. An exemplary procedure for dynamically determining the location and association of the resources when they are connected to the network 10 can be implemented using the method illustrated in FIG. 4. Thus, instead of the endpoint 60 being connected and registering with the central processor 100, the resource is performing this function. As shown in FIG. 5, the resource being connected to the network is the minicomputer 110. In particular, when the minicomputer 110 is connected to the network 10, it connects to the central processor 100 via a fifth communication path 550, and then registers with the central processor 100 (step 210 of FIG. 4). The registration of the minicomputer 110 takes place by the minicomputer 110 transmitting its assigned address, e.g., the IP address, to the central processor 100 via the fifth communication path 550. After the registration of the minicomputer 110, the central processor 100 forwards a list of all landmarks on the network 10 (which are known to the central processor 100) via the fifth communication path 550 to the minicomputer 110 (step 220 of FIG. 4). As shown in the exemplary illustration of FIG. 6, there are two exemplary landmarks 160, 170 provided on the network 10.

In the embodiment where a number of central processors store and manage separate respective lists of landmarks on the network 10, the minicomputer 110 can connect to the central processor 100 which is provided on a subnet of the network 10 to which the minicomputer 110 connects. The central processor 100 then transmits to the minicomputer 110 a list of a particular set of the landmarks which is managed by the central processor 100. This particular set may include all landmarks or only specific landmarks (e.g., those which reside on the portion of the network 10 managed by the particular central processor 100).

After the receipt of the list of the landmarks 160, 170, the minicomputer 110 determines its distance and/or latency from each of the landmarks 160, 170 provided in the list by the central processor 100 using, e.g., the latency measurement mechanism (step 230 of FIG. 4). As shown in FIG. 6, the minicomputer 110 would execute the latency measurement mechanism (e.g., the "ping") to determine its relative distance, in terms of latency, from the landmark 160. Thus, the minicomputer 110 transmits this mechanism via a sixth communication path 560.

As shown in FIG. 6, the landmark 160 is provided substantially near the connection point of the minicomputer 110 to the network 10. Also, no other devices are interconnected between the minicomputer 110 and the landmark 160 on the sixth communication path 560. Thus, the time returned by the endpoint's execution of the mechanism for the landmark 160 is relatively small, and therefore the distance between the minicomputer 110 and the landmark 160 is also short. There is only a single "hop" provided between the minicomputer 110 and the landmark 160, as illustrated in FIG. 6.

However, the landmark 170 may be provided at a distance from the minicomputer 110. Also, the minicomputer 110 executes the latency measurement mechanism to reach the landmark 170 via a seventh communication path 570 and contacts the router 180, and then via an eighth communication path 580 to contact the landmark 170. Thus, the time returned by the minicomputer's execution of the mechanism for the landmark 170 is longer in comparison with the time returned for the landmark 160. Therefore, the distance between the minicomputer 110 and the landmark 170 is also longer in comparison with the distance between the minicomputer 110 and the landmark 160. Also, due to the requirement to use the seventh and eighth communication paths 570, 580, there are two "hops" provided between the minicomputer 110 and the landmark 160. The determination of the distance between the minicomputer 110 and the respective landmarks can also be performed by utilizing the number of hops that it takes to reach each respective landmark from the endpoint 60.

Thereafter, the minicomputer 110 compiles a list of the distances, times and/or latencies between the minicomputer 110 and each of the landmarks 160, 170. The list is then sorted in increasing order, from the smallest distance, time and/or latency between the minicomputer 110 and the landmarks to the largest (step 240 in FIG. 4). This exemplary sorted list can include the name of the landmark, the address thereof, and the time/distance/latency from the minicomputer.

Then, in step 250 of FIG. 4, the minicomputer 110 transmits the sorted list of the distances/times/latencies to the central processor 100, which stores this list (in association with the minicomputer 110) in its storage device. Thereafter, the central processor 100 may allocate the requested resource (that is requested by and closest to the endpoint 60) to the endpoint 60. Then, the process according to the present invention is completed.

There are a number of ways to determine the closest distance, time and/or latency between the endpoint 60 and the resources, by other than the use of the latency measurement mechanism described above. According to one such exemplary embodiment, it is possible to have the landmarks 160, 170, and the endpoint 60 synchronize their clocks using the Network Time Protocol ("NTP"). In this exemplary embodiment, the landmarks 160, 170 periodically transmit multicast messages thereby advertising themselves as being connected to the network 10. This multicast message includes the time that it was transmitted. The endpoints which receive the message compare the time of their receipt of the message with the time of the transmission. Because the clocks of the endpoints and the resources can be synchronized, the time it takes for the message to reach each endpoint from the resource can be easily calculated.

It is also possible for each endpoint to receive a large number of multicast messages from the same resource. Upon the receipt of such multicast messages for the resource, the respective endpoint can average the difference between the receipt and transmission time of the multicast messages to determine the average latency for each such landmark. This average can be used to sort the sorted list of the distances/times/latencies.

Figure 7:
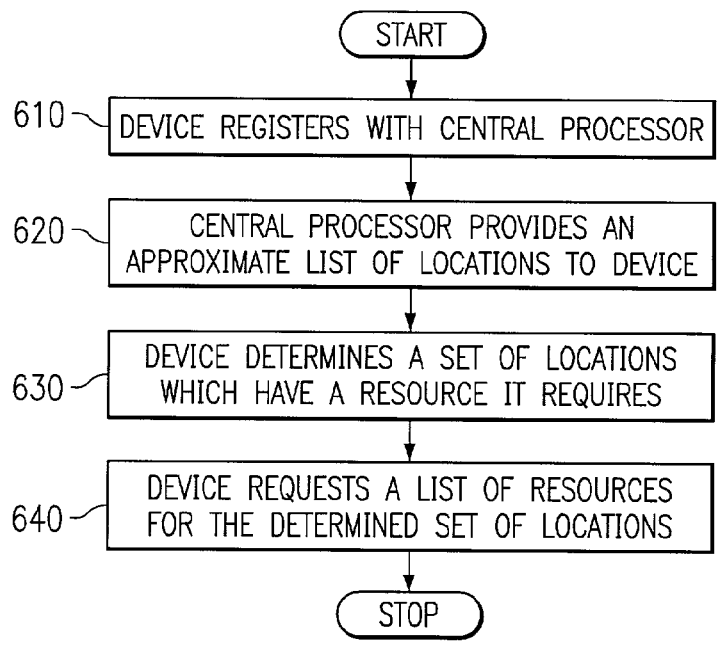
FIG. 7 is a flow diagram illustrating another exemplary embodiment of a method for determining a relative location of the device of the network.

In another embodiment illustrated in FIG. 7, the method and system uses hierarchical lists to determine the closest resource to the endpoint 60. For example, when the endpoint 60 registers with the network 10 (step 610), the central processor 100 returns, to the endpoint 60, an "approximate" list of locations (step 620) which are accessible by the endpoint 60. Then, the endpoint 60 determines a set of locations, from the approximate locations it receives from the central processor 100, which have the resource it requires (step 630). It is also within the scope of the present invention for the central processor 100 to determine the set of locations having the resource required by the endpoint 60. In one exemplary embodiment, the endpoint 60 and/or the central processor 100 determine one location at which the landmarks are provided closest to the endpoint, and which are associated with the resources that are required by the endpoint. Then, the central processor 100 transmits a more accurate sorted list of the landmarks associated with the set of the locations (step 640). This list includes the distances/times/latencies between the endpoint 60 and each landmark which relates to the respective one of the set of location. Thereafter, the endpoint 60 and/or the central processor 100 can utilize the method illustrated in FIG. 4 to obtain the resources which are associated with the closest landmark having the requisite resource. Using this method, the central processor 100 can determine the approximate location of the resources (and the endpoints), and thus determine which resources are closest to the endpoints.

In the manner described above, it is possible to dynamically locate and assign resources to endpoints on the network. This is especially beneficial in a growing network 10 where the resources and/or endpoints are constantly removed, modified, moved and added.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for determining a relative location of a device on a network, comprising the steps of:
  a) receiving a list of landmark nodes provided on the network;
  b) determining a value which is at least one of a time, a latency and a distance from the device to each of the landmark nodes; and
  c) transmitting each of the determined values corresponding to the respective node of the landmark nodes to a central arrangement to provide the relative location of the device with respect to the landmark nodes.

2. The method according to claim 1, further comprising the step of:
  d) prior to step (c), associating each of the values with the respective node of the landmark nodes to create a measured list.

3. The method according to claim 2, further comprising the step of:
  e) sorting the measured list, wherein step (c) includes transmitting the sorted measured list to the central arrangement.

4. The method according to claim 3, wherein the measured list is sorted from a smallest value of the determined values to a largest value of the determined values.

5. The method according to claim 1, wherein the device performs steps (a), (b) and (c).

6. The method according to claim 5, wherein the device is an endpoint device.

7. The method according to claim 5, wherein the device is a resource device.

8. The method according to claim 1, further comprising the step of:
  f) prior to step (a), registering the device with the central arrangement when the device is connected to the network, wherein the determined values corresponding to the landmark nodes are transmitted in response to the registration of the device.

9. The method according to claim 1, wherein the device performs step (b) by obtaining a result from at least one of:
  a ping on each of the landmark nodes, and
  a response time-type command executed on each of the landmark nodes.

10. The method according to claim 9, wherein the result provides at least one of the time, the latency and the distance of the device to each of the landmark nodes.

11. The method according to claim 1, further comprising the step of:
  g) with the device, monitoring messages transmitted by each of the landmark nodes to obtain a receipt time of each of the messages by the device, each of the messages including a transmission time by the respective node of the landmark nodes, wherein the values of the landmark nodes are determined in step (b) by comparing the transmission and receipt times of each of the landmark nodes.

12. The method according to claim 11, wherein a clock of the device and clocks of the landmark nodes are synchronized prior to step (g).

13. The method according to claim 1, further comprising the steps of:
  h) after step (c), receiving a list of further landmark nodes which are a subset of the landmark nodes;

i) determining the values for the further landmark nodes with respect to the device, the determined values for the further landmark nodes being smaller than the determined values for the landmark nodes that are not the further landmark nodes; and j) transmitting the determined values for the further landmark nodes to the central arrangement.

14. The method according to claim 1, further comprising the steps of:

k) requesting a resource by the device;

l) assembling a list of particular landmark nodes each of which is associated with the resource, the list of the particular landmark nodes being a subset of the landmark nodes; and m) allocating the resource to the device based on the determined values for each of the particular landmark nodes.

15. The method according to claim 14, wherein the resource is allocated to the device if the determined value for the respective node from the list of the particular landmark nodes associated with the resource is the smallest value of the values determined for the particular landmark nodes.

16. A device for determining its relative location on a network, comprising:

a processing arrangement which is programmed to:

a) receive a list of landmark nodes provided on the network, b) determine a value which is at least one of a time, a latency and a distance from the device to each of the landmark nodes, and c) transmit each of the determined values corresponding to the respective node of the landmark nodes to a central arrangement to provide the relative location of the device with respect to the landmark nodes.

17. The device according to claim 16, wherein the processing arrangement creates and sorts a measured list, and transmits the sorted measured list to the central arrangement.

18. The device according to claim 17, wherein the measured list is sorted from a smallest value of the determined values to a largest value of the determined values.

19. The device according to claim 16, wherein the device is an endpoint device.

20. The device according to claim 16, wherein, prior to receiving a list of the landmark nodes, the processing arrangement registers the device with the central arrangement when the device is connected to the network, and wherein the processing arrangement transmits the determined values corresponding to the landmark nodes in response to the registration of the device.

21. The device according to claim 16, wherein the device performs step (b) by obtaining a result from at least one of:

a ping on each of the landmark nodes, and a response time-type command executed on each of the landmark nodes.

22. The device according to claim 21, wherein the result provides at least one of the time, the latency and the distance of the device to each of the landmark nodes.

23. The device according to claim 16, wherein the processing arrangement monitors messages transmitted by each of the landmark nodes to obtain a receipt time of each of the messages by the device, each of the messages including a transmission time by the respective node of the landmark nodes, and wherein the processing arrangement determines the values for the landmark nodes by comparing the transmission and receipt times of each of the landmark nodes.

24. The device according to claim 23, wherein, before the determination of the values for the landmark nodes, a clock of the device and clocks of the landmark nodes are synchronized.

25. The device according to claim 16, wherein, after the transmission of the determined values for the landmark nodes, the processing arrangement receives a list of further landmark nodes which are a subset of the landmark nodes, and determines the values for the further landmark nodes with respect to the device, the determined values of the further landmark nodes being smaller than the values of the landmark nodes that are not the further landmark nodes, and wherein the processing arrangement transmits the determined values for the further landmark nodes to the central arrangement.

26. The device according to claim 16, wherein the processing arrangement requests a resource, and receives and assembles a list of particular landmark nodes, each of which is associated with the resource, the list of the particular landmark nodes being a subset of the landmark nodes.

27. A method for associating a device with a landmark node on a network, comprising the steps of:

a) registering the device on the network, the device being at least one of an endpoint and a resource;

b) at the device, receiving a list of landmark nodes provided on the network;

c) at the device, determining a value which is at least one of a time, a latency and a distance from the device to each of the landmark nodes;

d) transmitting each of the determined values corresponding to the respective node of the landmark nodes to a central arrangement to provide the relative location of the device with respect to the landmark nodes;

e) associating the device with at least one of the landmark nodes based on the transmitted values; and f) allocating a resource to the device based on the transmitted values for the landmark nodes, wherein the resource is allocated to the device if the transmitted value for the respective node of the landmark nodes associated with the resource is the smallest value of the transmitted values for the landmark nodes.

28. A system for associating a device with a landmark node on a network, comprising:

a device which is registered on the network, the device being at least one of an endpoint and a resource, the device receiving a list of landmark nodes provided on the network and determining a value which is at least one of a time, a latency and a distance from the device to each of the landmark nodes; and a central processor receiving each of the determined values corresponding to the respective node of the landmark nodes, the received determined values providing the relative location of the device with respect to the landmark nodes, the central processor associating the device with at least one of the landmark nodes based on the received determined values.

29. The system according to claim 28, wherein the central processor allocates a resource to the device based on the received determined values for the landmark nodes.

30. The system according to claim 29, wherein the central processor allocates the resource to the device if the received determined value of the respective node of the landmark nodes associated with the resource is the smallest value of the received determined values for the landmark nodes.

31. A system for determining a relative location of a device on a network, comprising:
   a) means for receiving a list of landmark nodes provided on the network;
   b) means for determining a value which is at least one of a time, a latency and a distance from the device to each of the landmark nodes; and
   c) means for transmitting each of the determined values corresponding to the respective node of the landmark nodes to a central arrangement to provide the relative location of the device with respect to the landmark nodes.

32. Logic encoded in a processing arrangement and operable to determine a relative location of a device on a network by executing the steps comprising of:
   a) receiving a list of landmark nodes provided on the network;
   b) determining a value which is at least one of a time, a latency and a distance from the device to each of the landmark nodes; and
   c) transmitting each of the determined values corresponding to the respective node of the landmark nodes to a central arrangement to provide the relative location of the device with respect to the landmark nodes.

* * * * *